United States Patent [19]

Choi

[11] Patent Number: 5,731,668
[45] Date of Patent: Mar. 24, 1998

[54] DEVICE FOR LOCKING A DRIVING MOTOR OF A DISC PLAYER

[75] Inventor: Young-Suk Choi, Seoul, Rep. of Korea

[73] Assignee: Daewoo Electronics Co., Ltd., Seoul, Rep. of Korea

[21] Appl. No.: 686,833

[22] Filed: Jul. 26, 1996

[30] Foreign Application Priority Data

Jul. 28, 1995 [KR] Rep. of Korea ............... 95-22775
Jul. 28, 1995 [KR] Rep. of Korea ............... 95-22776

[51] Int. Cl.⁶ ................................................ G11B 33/12
[52] U.S. Cl. ............................................ 318/15; 369/264
[58] Field of Search ................................ 318/9, 12, 15; 369/75.2, 263, 264

[56] References Cited

U.S. PATENT DOCUMENTS

| | | |
|---|---|---|
| 3,751,044 | 8/1973 | Sawada . |
| 3,973,793 | 8/1976 | Hirst, Jr. et al. . |
| 5,583,839 | 12/1996 | Choi ........................ 369/75.2 |
| 5,586,104 | 12/1996 | Choi ........................ 369/264 |

*Primary Examiner*—Bentsu Ro
*Attorney, Agent, or Firm*—Lowe, Price, LeBlanc & Becker

[57] ABSTRACT

A device for locking a driving motor of a disc player screw-couples a turntable driving motor and a drive chassis, which includes a screw-coupling part for arranging electromotive drivers on positions corresponding to plural screw recesses formed to the drive chassis and driving motor. Respective electromotive drivers are symmetrically arranged to each other, and the screw-coupling part is connected to a chuck member which screw-couples the driving motor and drive chassis by rotatably driving the symmetrically positioned electromotive drivers at the same speed and with the same torque in the opposite direction to each other by a pressing portion while moving in the motor shaft direction of the driving motor. The electromotive drivers of the screw-coupling part may be replaced with drivers driven by a single motor. The screw-coupling part is operated by a second driving part including the single motor and a gear portion having a direction-shifting gear connected to the single motor to allow two drivers on the symmetrical positions to each other to rotate in the opposite direction at the same speed.

20 Claims, 6 Drawing Sheets

5,731,668

DEVICE FOR LOCKING A DRIVING MOTOR OF A DISC PLAYER

BACKGROUND OF THE INVENTION

1. Field of the Invention

The present invention relates to a device for locking a driving motor of a disc player, and more particularly to a device for locking a driving motor of a disc player, wherein the driving motor for rotating a turntable assembly of the disc player is screw-coupled to a drive chassis without producing a skew for enhancing playback accuracy.

2. Description of the Prior Art

Generally, an appliance such as optical video disc players, digital audio disc players and compact disc players is an apparatus for performing recording or reproducing operation with respect to a disc capable of magnetic recording or optical recording. In these appliances, the disc containing a variety of audio signals or video signals is mounted to a turntable assembly of a corresponding disc player, and then the information is reproduced while rotating the disc by using the turntable assembly. U.S. Pat. Nos. 4,772,971, 5117,414 and 5,228,023 disclose examples of a construction and manufacturing method of the conventional turntable assembly.

The construction of the conventional turntable assembly and driving motor will be described with reference to FIGS. 1 and 2.

FIG. 1 is an exploded perspective view showing the conventional turntable assembly and driving motor, and FIG. 2 is a sectional view showing a joining state that the conventional turntable assembly is pressively-fitted into the driving motor.

Here, a reference numeral 10 denotes a spindle motor as a driving motor which is formed with a motor shaft 11 at an upper portion thereof. A supporting shaft member 20 is integrally formed with a cylindrical core portion 21 fitted with spindle motor shaft 11 and a supporting portion 22 for supporting a disc stand member 30. A plurality of insertion holes 24 are formed in the bottom plane of supporting portion 22 which has a circular groove 23 along the outer circumference thereof. Disc stand member 30 is shaped as a circular plate and has an opening 32 for being penetrated with supporting shaft member 20. The inner periphery of disc stand member 30 is engaged into circular groove 23 in the outer circumference of supporting portion 22. Disc stand member 30 is formed with a bending portion 31 which is upwardly bent for seating a disc on the circular plate thereof. A spring 60 is fitted to an upper portion of cylindrical core portion 21 of supporting shaft member 20. A pressing member 40 is put on cylindrical core portion 21 of supporting shaft member 20 coupled with spring 60. Pressing member 40 is formed with hook-like projections 41 directing downward to be respectively inserted to insertion holes 24 of supporting shaft member 20.

By this construction, as shown in FIG. 2, a turntable assembly T is installed under the state of being inserted with motor driving shaft 11. While disc is mounted to the upper portion of turntable assembly T, information within disc can be reproduced with the rotatable driving of spindle motor 10. Spindle motor 10 for rotating turntable assembly T as above is fixedly installed to the lower portion of drive chassis 70 by means of screws.

In accordance with the bottom flatness of drive chassis 70, upper flatness of spindle motor 10 and the locking state between drive chassis 70 and spindle motor 10, a fixing angle of spindle motor 10 and spindle motor shaft 11 is determined. Since the orientation of motor 10 and motor shaft 11 significantly affects playback accuracy, especially drive chassis 70 and spindle motor 10 must be precisely fabricated during the processing. That is, if the bottom flatness of drive chassis 70 exceeds 0.07°, a skew (inclination) is produced at spindle motor shaft 11 of spindle motor 10. When the inherent skew of spindle motor 10 and the skew resulting from the bottom flatness of drive chassis 70 are not offset to each other, the playback accuracy is degraded due to the shaking during the rotation of turntable assembly T.

Typically, if respective screws are differently driven while spindle motor 10 is screw-coupled to drive chassis 70, the skew occurs at spindle motor shaft 11. Then, if motor driving shaft 11 is joined to the rotation center of turntable assembly T, i.e., cylindrical core portion 21 of supporting shaft member 20, under the state that the skew occurs at spindle motor shaft 11, the eccentricity of turntable assembly T becomes further great owing to the skew of spindle motor shaft 11. For this reason, turntable assembly T is shaken when spindle driving shaft 11 is rotated to degrade the playback accuracy.

Additionally, a worker has heretofore screw-coupled spindle motor 10 to drive chassis 70 by means of an electromotive driver. Thus, the working time is delayed, and the screwing status are not consistent throughout respective screw coupling portions. Moreover, a moment caused during coupling respective screws induces a warping phenomena upon the drive chassis to further severe the skew phenomena generated at the driving shaft of the spindle motor.

SUMMARY OF THE INVENTION

It is an object of the present invention to provide a device for locking a driving motor of a disc player, wherein a spindle motor for rotating a turntable assembly of the disc player is screw-coupled to a drive chassis without causing a skew to improve playback accuracy.

To achieve the above object of the present invention, a device for locking a driving motor of a disc player includes a fixing part arranged with the turntable driving motor and a turntable assembly onto an upper plane thereof for fixedly arranging a drive chassis installed to a plane perpendicular to a motor shaft to an upper plane of the driving motor. Also, a screw-coupling part is installed to an upper portion of the fixing part for screw-coupling the drive chassis to the driving motor, and arranged with electromotive drivers to respective portions corresponding to a plurality of screw recesses formed to the drive chassis and driving motor, in which the electromotive drivers are installed to be identically distanced from corresponding screw recesses in the motor shaft direction. The screw-coupling part is transferred by a motion part in the motor shaft direction toward or opposite to the fixing part, and a first driving part drives the motion part.

Here, the electromotive drivers of the screw-coupling part are installed to be symmetrically positioned by using the central portion as a reference, and the electromotive drivers symmetrically positioned to each other in the screw-coupling part insert screws while being rotated at the same speed and with the same torque in the opposite direction to each other during the screw-coupling operation.

Preferably, the motion part includes a chuck member moved in the motor shaft direction while being joined with the screw-coupling part and a pressing portion for controlling the motion of the chuck member. At this time, the chuck member has an upper member connected to the pressing portion, and a locker fitted with the screw-coupling part to the lower portions. In addition to these, the chuck member includes a male screw portion formed along the outer circumference of the locker, and a coupler screw-coupled to the male screw portion for adjusting the diameter of the locker. The pressing portion of the motion part is formed by an oil hydraulic cylinder and a piston.

In the device for locking the driving motor of the disc player according to the present invention having the foregoing structure, the electromotive drivers symmetrically positioned to each other are rotated in the opposite direction but at the same speed and with the same torque to perform the insertion operation while the spindle motor is screw-coupled to the drive chassis. Consequently, the screwing state becomes consistent for each screw-coupling part, and the moment produced during the screw-coupling operation is offset to be eliminated, thereby preventing the warping of the drive chassis.

Also, since respective electromotive drivers are operated for the identical time to be locked with the same depth, the upper plane of the spindle motor is closely attached to the lower plane of the drive chassis to be uniform under the state that the spindle motor is not slanted.

Therefore, no skew phenomena occurs at the driving shaft of the spindle motor to execute the locking of the turntable assembly and driving motor shaft with significantly high precision, thereby enhancing the playback accuracy during the reproducing operation of the disc.

Further to these, the screw-coupling is completed by once to be effective in remarkably shortening the operating time.

Alternatively, to achieve the above object of the present invention, a device for locking a driving motor of a disc player includes a fixing part arranged with the turntable driving motor and a turntable assembly onto an upper plane thereof for fixedly arranging a drive chassis installed to a plane perpendicular to a motor shaft to an upper plane of the driving motor. A screw-coupling part installed to an upper portion of the fixing part for screw-coupling the drive chassis to the driving motor is arranged with electromotive drivers to respective portions corresponding to a plurality of screw recesses formed to the drive chassis and driving motor, in which the electromotive drivers are installed to be identically distanced from corresponding screw recesses in the motor shaft direction. Then, a second driving part drives the drivers of the screw-coupling part by means of a single motor, and a motion part transfers the screw-coupling part in the motor shaft direction toward or opposite to the fixing part. Also, a first driving part drives the motion part.

Preferably, the second driving part includes the single driving motor and a gear portion connected to a rotating shaft of the driving motor, in which the gear portion includes a main gear installed to the rotating shaft of the driving motor, a direction-shifting gear brought into meshing engagement with one side of the main gear, a first sub-gear brought into meshing engagement with the direction-shifting gear, and a second sub-gear brought into meshing engagement with the opposite side of the main gear. Here, the gear shafts of the first and second sub-gears coincide with rotating shafts of the drivers.

By this construction, the symmetrically positioned two drivers of the screw-coupling part are rotated in the opposite direction to each other at the same speed and with the same torque.

As a result, in addition to the above-described effects, the device for locking the driving motor of the disc player according to the present invention constructed as above is advantageous in that two drivers symmetrically positioned to each are rotated by the single motor in the opposite direction but at the same speed and with the same torque to perform the screw-inserting operation while the spindle motor is screw-coupled to the drive chassis. Thus, the number of the parts is reduced to be cost effective in manufacturing.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Hereinafter, a device for locking a driving motor of a disc player according to the present invention will be described in detail with reference to the accompanying drawings.

First Embodiment

Figure 1:
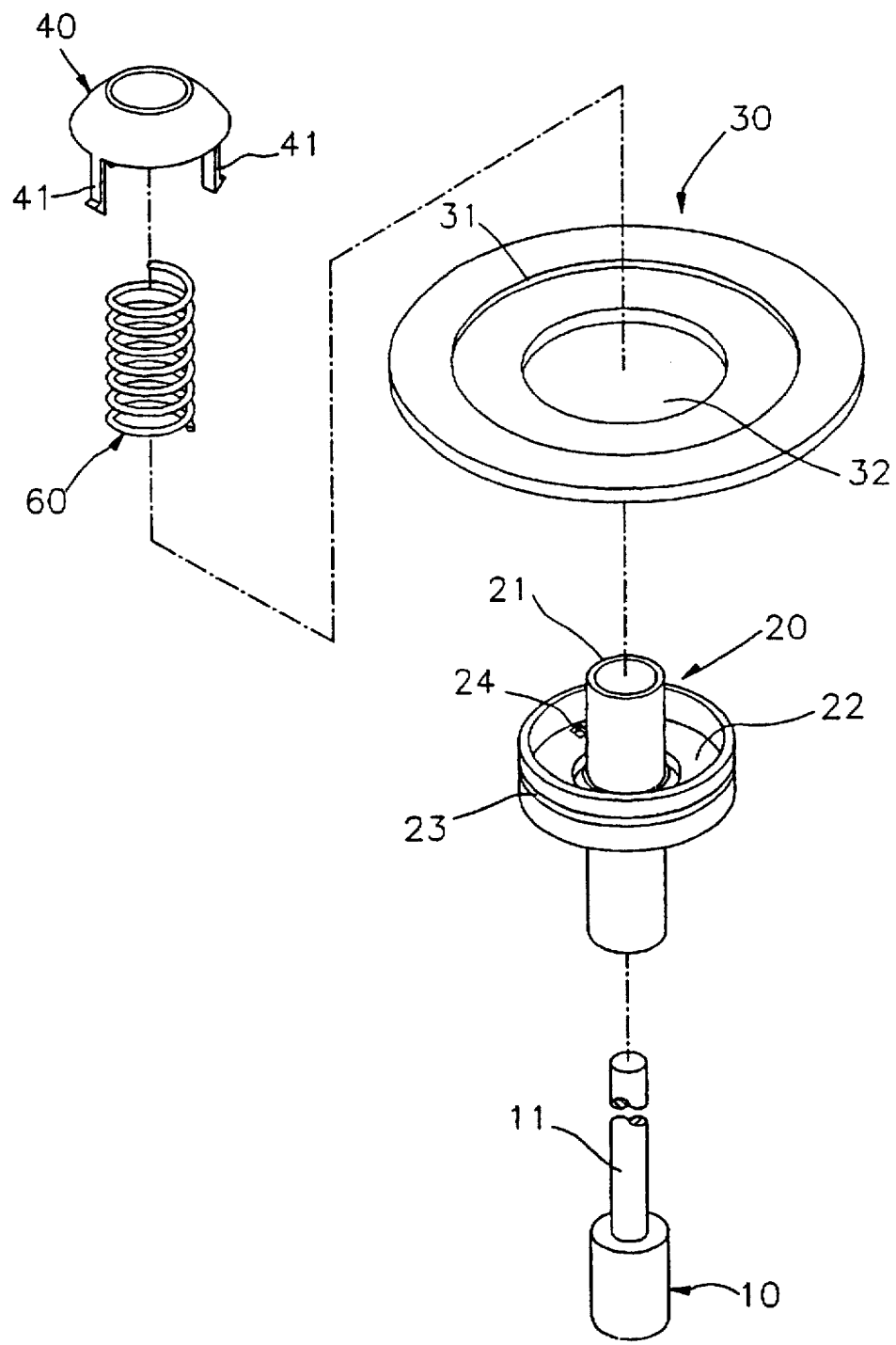
FIG. 1 is an exploded perspective view showing a conventional turntable assembly and a driving motor.
Figure 2:
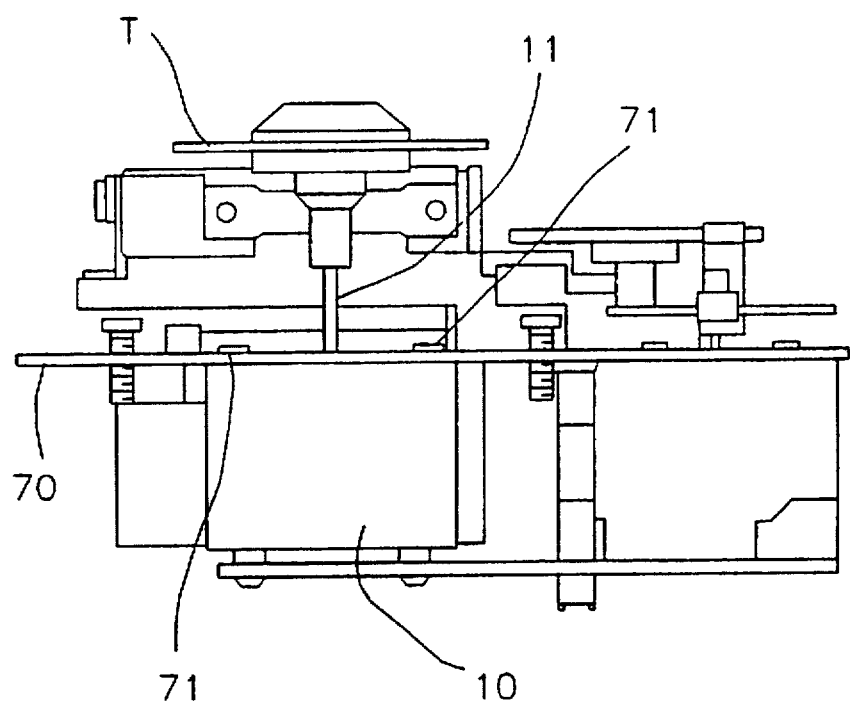
FIG. 2 is a sectional view showing a joining state that the conventional turntable assembly is press-fitted to the driving motor.
Figure 3:
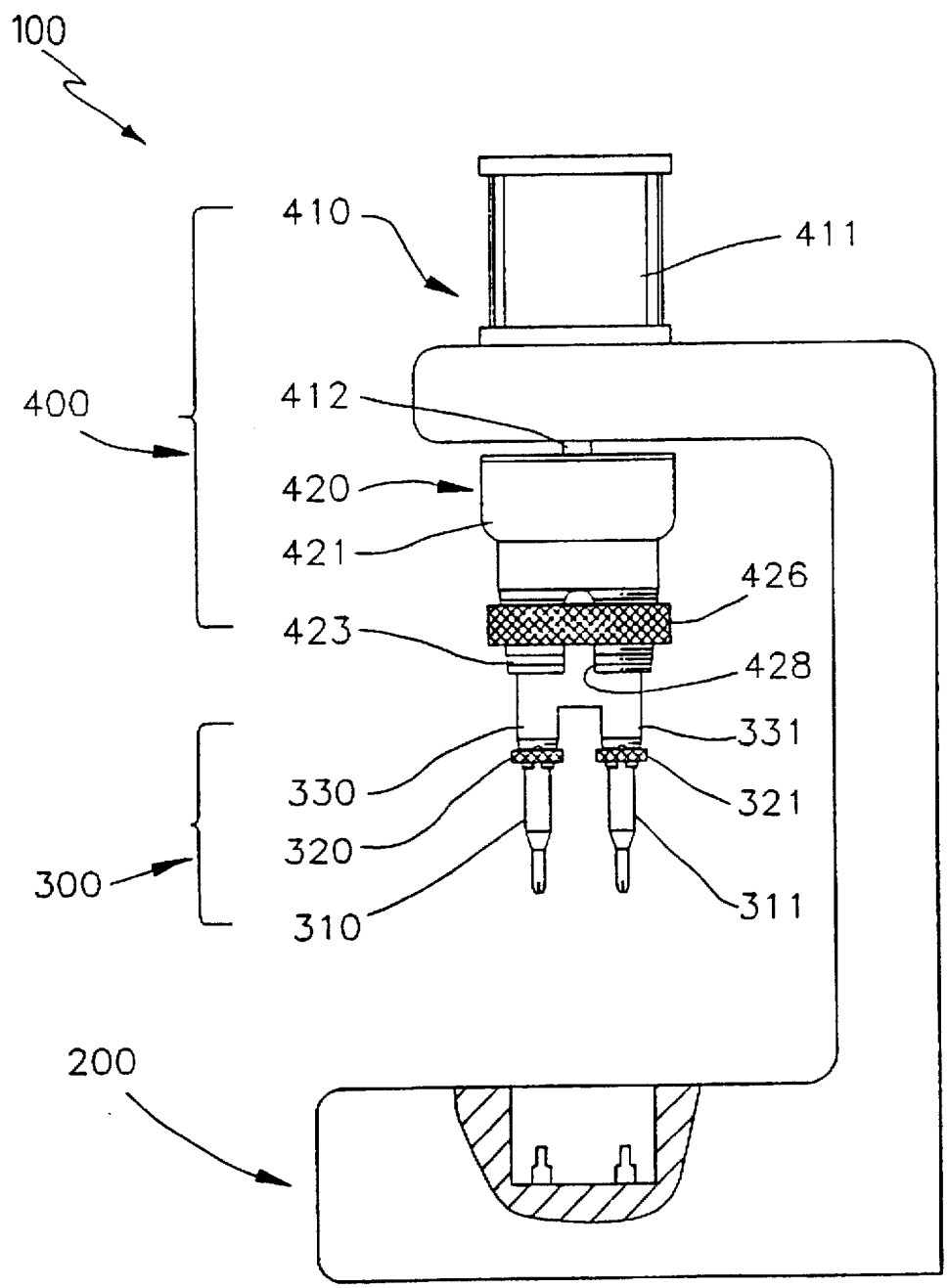
FIG. 3 is a schematic sectional view showing a first embodiment of a device for locking a driving motor of a disc player according to the present invention.
Figure 4:
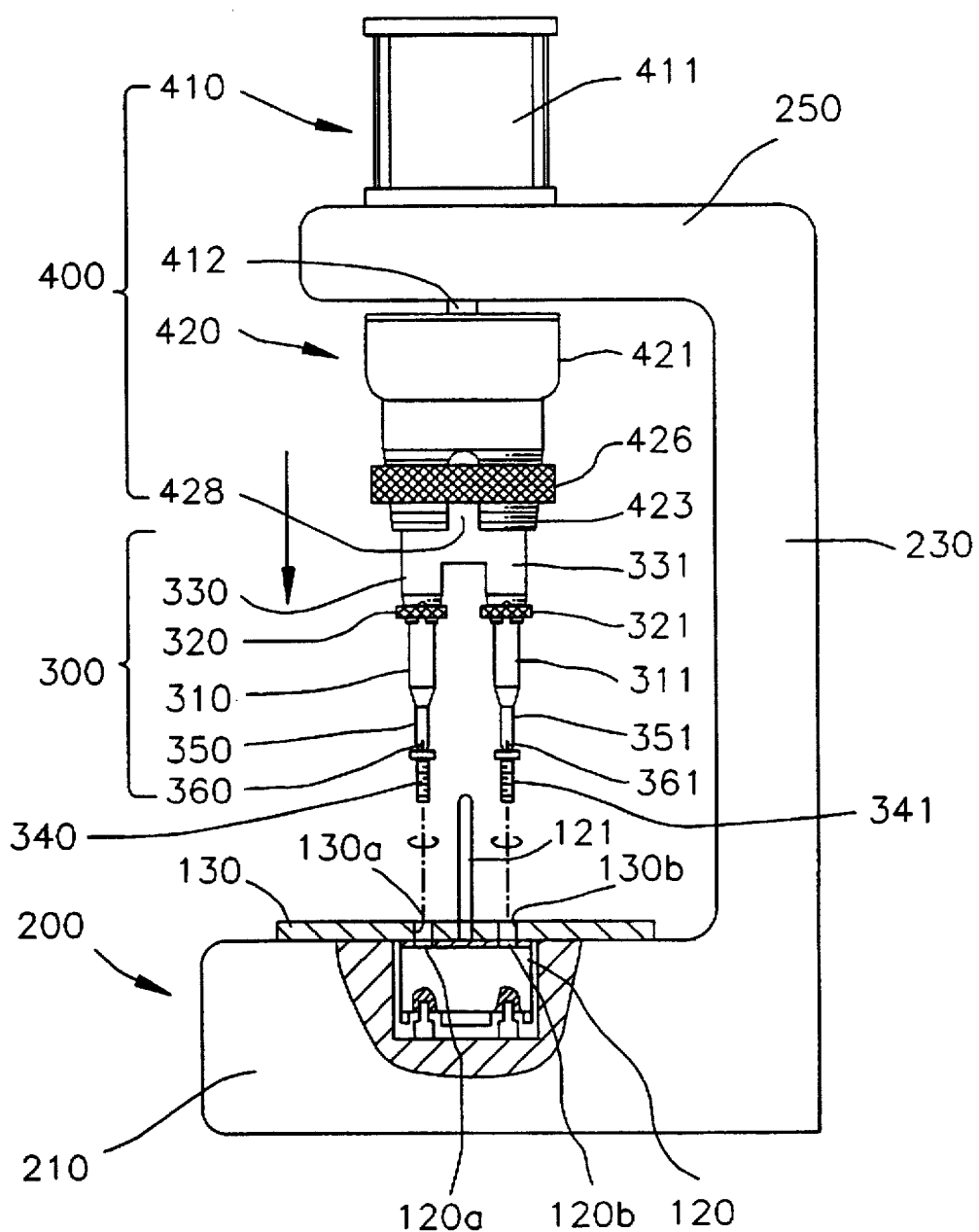
FIG. 4 is a view showing the device for locking the driving motor of the disc player shown in FIG. 3 under the screw-coupling operation.
Figure 5:
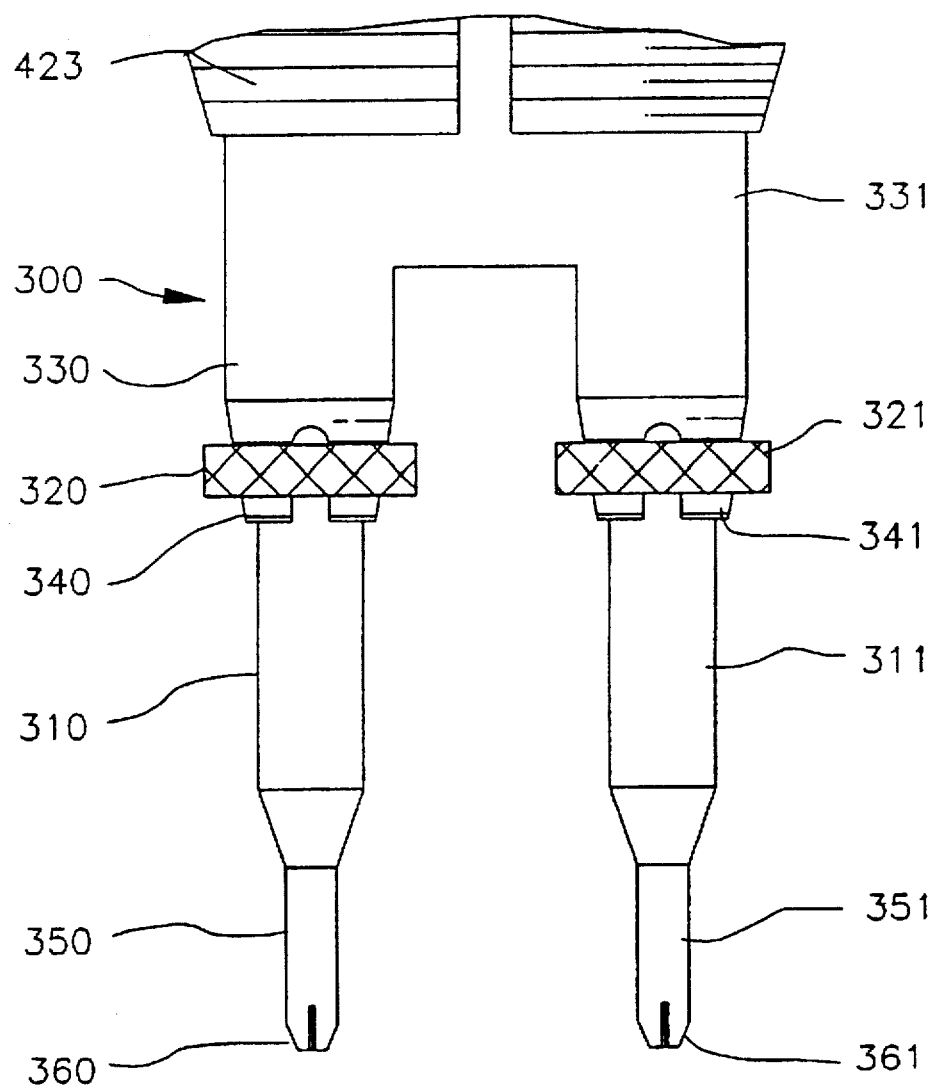
FIG. 5 is an enlarged section view showing the screw-coupling part of the device for locking the driving motor of the disc player.

FIG. 3 is a schematic sectional view showing a first embodiment of the device for locking the driving motor of the disc player according to the present invention, and FIG. 4 is a view showing a state that the device for locking the driving motor of the disc player shown in FIG. 3 is under the screw-coupling operation. FIG. 5 is an enlarged section view showing the screw-coupling part of the device for locking the driving motor of the disc player shown in FIG. 3.

As shown in FIGS. 3, 4 and 5, a base 210 of a fixing part 200 is installed with a turntable spindle motor 120, and a drive chassis 130 installed to the plane making a right angle to a motor shaft 121 is installed to the upper plane of spindle motor 120. Drive chassis 130 is provided for arranging turntable assembly 120 to the upper plane thereof.

Fixing part 200 is installed with a supporting stand 230 extending to bend in the vertically upward direction from base 210, i.e., the motor shaft direction. Supporting stand 230 is bent to extend the direction in parallel with base 210 at a predetermined height of supporting stand 230 to install an upper panel portion 250.

A driving motor locking device 100 is installed with a motion part 400 to upper panel portion 250 of fixing part 200. Motion part 400 is formed of a pressing portion 410 and a chuck member 420. Motion part 400 is driven by a first driving part (not shown).

Pressing portion 410 has an oil hydraulic cylinder 411 connected to upper panel portion 250 and a piston 412 operated by oil hydraulic cylinder 411. Chuck member 420 is connected to the lower portion of pressing portion 410. Pressing portion 410 controls the movement of chuck member 420 by the operations of oil hydraulic cylinder 411 and piston 412. That is, chuck member 420 is movable up and down in the motor shaft direction by pressing portion 410.

Chuck member 420 of motion part 400 has a locker 426 fitted with a screw-coupling part 300 at the lower portion thereof. Chuck member 420 is formed with a male screw portion 423 along the outer periphery of locker 426. Chuck member 420 further has a coupler 428 mated to male screw portion 423 for adjusting the diameter of locker 426.

Screw-coupling part 300 is installed to a predetermined place of the upper portion of base 210 of fixing part 200 for screw-coupling drive chassis 130 to spindle motor 120. Screw-coupling part 300 is joined to the lower plane of chuck member 420 of motion part 400 for being integrally movable up and down together with chuck member 420.

The upper portion of screw-coupling part 300 is fitted into locker 426 of chuck member 420 to be screwed up by coupler 428, thereby being fixed. Lockers 330 and 331 are formed to both sides of the lower portion of screw-coupling part 300 for being respectively fitted with driver bodies 310 and 311. Lockers 330 and 331 are formed to portions corresponding to the plurality of screw recesses formed into drive chassis 130 and spindle motor 120. Male screws 340 and 341 are formed to respective outer peripheries of lockers 330 and 331. Screw-coupling part 300 includes couplers 320 and 321 mated with male screws 340 and 341 for adjusting diameters of lockers 330 and 331. Respective driver bodies 310 and 311 are fitted into the lower portions of respective lockers 330 and 331 to be screwed by couplers 320 and 321, thereby being fixed. By this construction, minus or cross recessed tips 360 and 361 at the lower ends of rotating shafts 350 and 351 of respective the drivers respectively correspond to the plurality of screw recesses formed in drive chassis 130 and spindle motor 120. Tips 360 and 361 of the drivers are installed to portions identically distanced from respective screw recesses in the motor shaft direction.

The drivers are electromotive drivers driven by the motor, which are rotated in the opposite direction to each other at the same speed and with the same torque.

The electromotive drivers which are installed to be symmetrically positioned to each other about the center are rotated in the opposite direction during the screw-coupling operation to insert the screws, so that the moment at respective screw-coupling portions is offset. Here, it is obvious that the screws employed at both sides have different directions, i.e., right-handed screw and left-handed screw.

The tips of respective drivers may be fabricated by a magnet or magnetized substance for being easily attached with the screws.

An operation of the above-described embodiment will be described hereinbelow.

As shown in FIG. 4, turntable spindle motor 120 is installed to base 210 of fixing part 200, and drive chassis 130 is installed to the upper plane of spindle motor 120. Spindle motor 120 and drive chassis 130 are aligned such that portions to be screw-coupled, i.e., coupling holes 130a and 130b of drive chassis 130 and coupling holes 120a and 120b of spindle motor 120 coincide with one another on a plane that drive chassis 130 makes a right angle with motor shaft 121.

Under this state, the right-handed and left-handed screws are attached to the minus or cross recessed tips 360 and 361 at the lower ends of rotating shafts 350 and 351 of both electromotive drivers installed to the upper portion of base 210.

Then, oil hydraulic cylinder 411 of motion part 400 is driven by the driving of the first driving part to descend piston 412. Rotating shafts 350 and 351 of the electromotive drivers are rotated in the opposite direction to each other while chuck member 410 descends as above. By doing so, respective screws are sequentially inserted to coupling holes 130a and 130b of drive chassis 130 and coupling holes 120a and 120b of spindle motor 120 to screw-couple spindle motor 120 and drive chassis 130.

After screw-coupled turntable spindle motor 120 and drive chassis 130 are separated from base 210 of fixing part 200, and another turntable spindle motor and drive chassis are installed to repeat the above-described operation.

In the first embodiment of the device for locking the driving motor of the disc player according to the present invention having the foregoing structure, the electromotive drivers symmetrically positioned to each other are rotated in the opposite direction but at the same speed and with the same torque to perform the insertion operation while the spindle motor is screw-coupled to the drive chassis. Consequently, the screwing state becomes consistent for each screw-coupling part, and the moment produced during the screw-coupling operation is offset to be eliminated, thereby preventing the warping of the drive chassis.

Also, since respective electromotive drivers are operated for the identical time to be locked with the same depth, the upper plane of the spindle motor is closely attached to the lower plane of the drive chassis to be uniform under the state that the spindle motor is not slanted.

Therefore, no skew phenomena occurs at the driving shaft of the spindle motor to execute the locking of the turntable assembly and driving motor shaft with significantly high precision, thereby enhancing the playback accuracy during the reproducing operation of the disc.

Further to these, the screw-coupling is completed by once to be effective in remarkably shortening the operating time.

Second Embodiment

Figure 6:
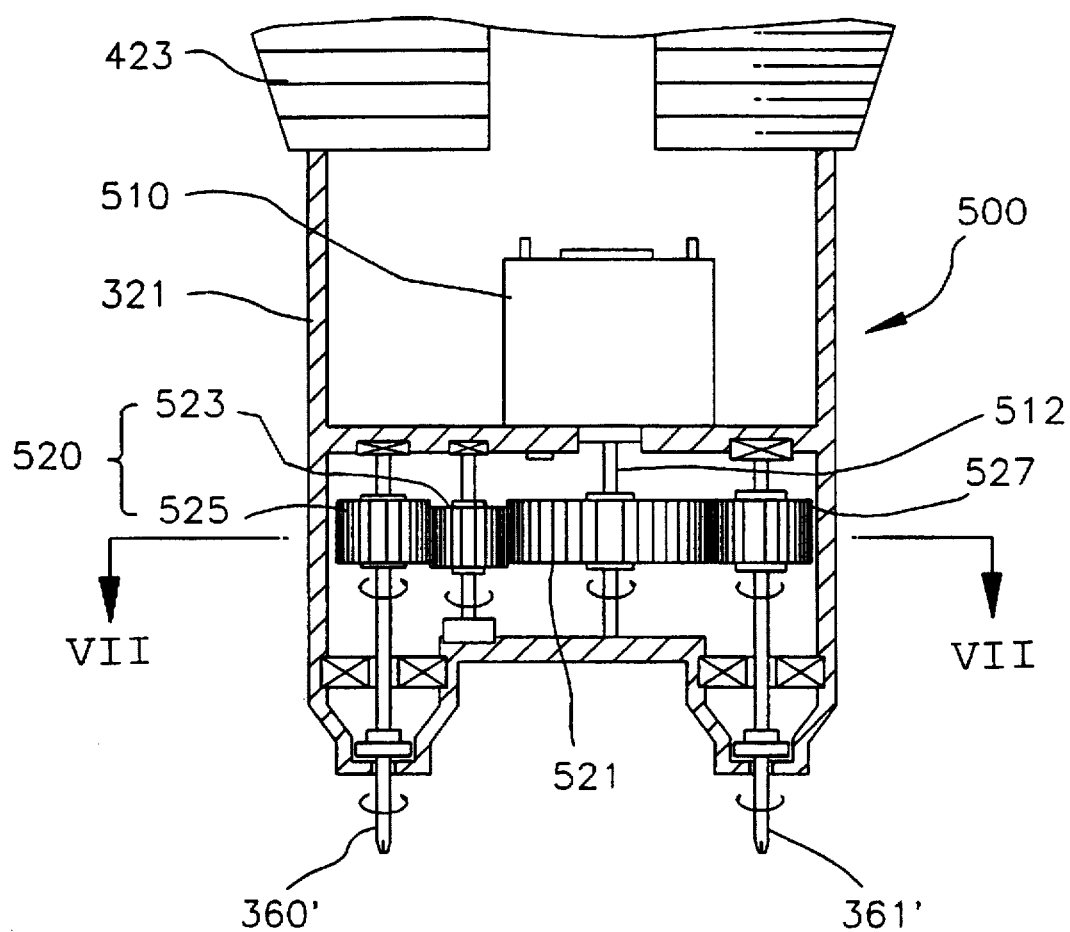
FIG. 6 is a sectional view showing the screw-coupling part in a second embodiment of the device for locking the driving motor of the disc player according to the present invention.
Figure 7:
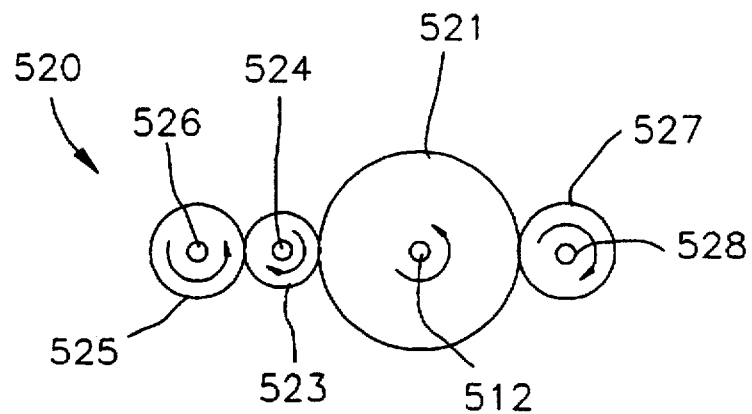
FIG. 7 is a fragmentary plan view showing the screw-coupling part taken along line VII—VII of the driving part shown in FIG. 6.

FIG. 6 is a sectional view showing a screw-coupling part in a second embodiment of the device for locking the driving motor of the disc player according to the present invention, and FIG. 7 is a fragmentary section view showing the screw-coupling part taken along line VII—VII in the driving part shown in FIG. 6.

All construction of the second embodiment of the present invention is identical to that of the first embodiment except for the driving motor locking device and screw-coupling part. Here, as shown in FIGS. 6 and 7, the screw-coupling part is constructed in such a manner that two drivers are rotated by a single motor in the opposite direction to each other but at the same speed and with the same torque.

A second driving part 500 for driving the electromotive drivers is formed to the inside of screw-coupling part 300. Second driving part 500 is formed by a spindle motor 510 installed approximately to the center thereof and a gear portion 520 connected to a rotating shaft 512 of spindle motor 510 for rotatably driving the electromotive driver. Gear portion 520 includes a main gear 521 installed to rotating shaft 512 of spindle motor 510, and a direction-shifting gear 523 and a first sub-gear 525 brought into meshing engagement therewith are installed to one side of main gear 521. Additionally, a second sub-gear 527 is installed to the opposite side of main gear 521. Minus or cross recessed tips 360' and 361' are formed to the lower ends of respective rotating shafts 526 and 528 of first and second sub-gears 525 and 527. Minus or cross recessed tips 360' and 361' respectively correspond to a plurality of screw recesses formed in drive chassis 130 and spindle motor 120, and are installed to be identically distanced from respective screw recesses in the motor shaft direction.

Thus, tips 360' and 361' are rotated by the single motor in the opposite direction to each other at the same speed and with the same torque.

Now, the operation of the second embodiment constructed as above will be described.

As the first embodiment, turntable spindle motor 120 is installed to base 210 of fixing part 200, and drive chassis 130 is installed to the upper plane of spindle motor 120. Spindle motor 120 and drive chassis 130 are aligned such that portions to be screw-coupled, i.e., coupling holes 130a and 130b of drive chassis 130 and coupling holes 120a and 120b of spindle motor 120 coincide with one another on a plane that drive chassis 130 makes a right angle with motor shaft 121.

Under this state, as shown in FIG. 6, the right-handed and left-handed screws are respectively attached to the minus or cross recessed tips 360' and 361' at the lower ends of rotating shafts 526 and 528 of first and second sub-gears 525 and 527 of gear portion 520 installed to the upper portion of base 210.

Then, oil hydraulic cylinder 411 of motion part 400 is driven by the driving of the first driving part to descend piston 412. Driving motor 510 of second driving part 500 is operated while chuck member 420 descends as above. Upon the driving of driving motor 510, driving motor shaft 512 is rotated and main gear 521 installed to the shaft 512 of driving motor 510 is rotated altogether. By doing so, first sub-gear 525 is rotated in the opposite direction of second sub-gear 527 by direction-shifting gear 523. In other words, first sub-gear 525 and second sub-gear 527 are rotated at the same speed and with the same torque but in the opposite direction to each other.

Therefore, respective gear shafts 526 and 528 of first sub-gear 525 and second sub-gear 527 are rotated in the opposite direction to each other. Accordingly, respective screws attached to tips 360' and 361' at the lower ends of respective gear shafts 526 and 528 are sequentially inserted to coupling holes 130a and 130b of drive chassis 130 and coupling holes 120a and 120b of spindle motor 120 to screw-couple spindle motor 120 and drive chassis 130.

After screw-coupled turntable spindle motor 120 and drive chassis 130 are separated from base 210 of fixing part 200, and another turntable spindle motor and drive chassis are installed to repeat the above-described operation.

In the second embodiment of the device for locking the driving motor of the disc player according to the present invention having the foregoing structure, two drivers symmetrically positioned to each are rotated by the single motor in the opposite direction but at the same speed and with the same torque to perform the screw-inserting operation while the spindle motor is screw-coupled to the drive chassis. Consequently, the number of the parts is reduced to be cost effective in manufacturing.

At the same time, the effects of the first embodiment are obtainable.

In more detail, the drivers symmetrically positioned to each other are rotated at the same speed and with the same torque to be inserted in the opposite direction to each other while the spindle motor is screw-coupled to the drive chassis. Thus, the screwing state becomes consistent for each screw-coupling part, and the moment produced during the screw-coupling operation is offset to be eliminated, thereby preventing the warping of the drive chassis.

Also, since respective electromotive drivers are operated for the same time to be locked with the same depth, the upper plane of the spindle motor is closely attached to the lower plane of the drive chassis to be uniform under the state that the spindle motor is not slanted.

Therefore, no skew phenomena occurs at the driving shaft of the spindle motor to execute the locking of the turntable assembly and driving motor shaft with significantly high precision, thereby enhancing the playback accuracy during the reproducing operation of the disc.

Further to these, the screw-coupling is completed by once to be effective in remarkably shortening the operating time.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A device for locking a driving motor of a disc player comprising:

a fixing part arranged with the turntable driving motor and a turntable assembly onto an upper plane thereof for fixedly arranging a drive chassis installed to a plane perpendicular to a motor shaft to an upper plane of said driving motor;

a screw-coupling part installed to an upper portion of said fixing part for screw-coupling said drive chassis to said driving motor, arranged with electromotive drivers to respective portions corresponding to a plurality of screw recesses formed to said drive chassis and driving motor, said electromotive drivers being installed to be identically distanced from corresponding screw recesses in the motor shaft direction;

a motion part for transferring said screw-coupling part in said motor shaft direction toward or opposite to said fixing part; and a first driving part for driving said motion part.

2. The device for locking a driving motor of a disc player as claimed in claim 1, wherein said electromotive drivers of said screw-coupling part are installed to be symmetrically positioned by using the central portion as a reference.

3. The device for locking a driving motor of a disc player as claimed in claim 2, wherein said electromotive drivers symmetrically positioned to each other in said screw-coupling part insert screws while being rotated at the same speed and with the same torque in the opposite direction to each other during the screw-coupling operation.

4. The device for locking a driving motor of a disc player as claimed in claim 3, wherein said screws inserted during said screw-coupling operation by respective electromotive drivers symmetrically positioned to each other employ screws respectively having different directions, i.e., right-handed screws and left-handed screws.

5. The device for locking a driving motor of a disc player as claimed in claim 1, wherein said motion part comprises a chuck member moved in the motor shaft direction while being joined with said screw-coupling part and a pressing portion for controlling the motion of said chuck member.

6. The device for locking a driving motor of a disc player as claimed in claim 5, wherein said chuck member comprises an upper member connected to said pressing portion, a locker fitted with said screw-coupling part to the lower portions, a male screw portion formed along the outer circumference of said locker, and a coupler screw-coupled to said male screw portion for adjusting the diameter of said locker.

7. The device for locking a driving motor of a disc player as claimed in claim 5, wherein said pressing portion of said motion part comprises an oil hydraulic cylinder and a piston.

8. The device for locking a driving motor of a disc player as claimed in claim 1, wherein tips of respective electromotive drivers are fabricated by a magnet or magnetized substance for being easily attached with screws.

9. The device for locking a driving motor of a disc player as claimed in claim 1, wherein said fixing part comprises a supporting stand bent to extend to the motor shaft direction from said base, and an upper panel portion bent to extent in the direction in parallel with said base to have a predetermined height from said supporting stand, for supporting said motion part on said upper panel portion.

10. A device for locking a driving motor of a disc player comprising:

- a fixing part arranged with the turntable driving motor and a turntable assembly onto an upper plane thereof for fixedly arranging a drive chassis installed to a plane perpendicular to a motor shaft to an upper plane of said driving motor;
- a screw-coupling part installed to an upper portion of said fixing part for screw-coupling said drive chassis to said driving motor, arranged with electromotive drivers to respective portions corresponding to a plurality of screw recesses formed to said drive chassis and driving motor, said electromotive drivers being installed to be identically distanced from corresponding screw recesses in the motor shaft direction;
- a second driving part for driving said drivers of said screw-coupling part by means of a single motor;
- a motion part for transferring said screw-coupling part in said motor shaft direction toward or opposite to said fixing part; and
- a first driving part for driving said motion part.

11. The device for locking a driving motor of a disc player as claimed in claim 10, wherein symmetrically-positioned two drivers of said screw-coupling part are rotated by said single motor of said second driving part in the opposite direction at the same speed and with the same torque.

12. The device for locking a driving motor of a disc player as claimed in claim 11, wherein screws inserted during said screw-coupling operation by respective drivers symmetrically positioned to each other employ screws respectively having different directions, i.e., right-handed screws and left-handed screws.

13. The device for locking a driving motor of a disc player as claimed in claim 10, wherein said second driving part comprises the single motor and a gear portion connected to a rotating shaft of said single motor, said gear portion comprising a main gear installed to said rotating shaft of said single motor, a direction-shifting gear brought into meshing engagement with one side of said main gear, a first sub-gear brought into meshing engagement with said direction-shifting gear, and a second sub-gear brought into meshing engagement with the opposite side of said main gear.

14. The device for locking a driving motor of a disc player as claimed in claim 13, wherein the gear shafts of said first and second sub-gears coincide with rotating shafts of said electromotive drivers.

15. The device for locking a driving motor of a disc player as claimed in claim 10, wherein said motion part comprises a chuck member moved in the motor shaft direction while being joined with said screw-coupling part and a pressing portion for controlling the motion of said chuck member.

16. The device for locking a driving motor of a disc player as claimed in claim 15, wherein said chuck member comprises an upper member connected to said pressing portion, a locker fitted with said screw-coupling part to the lower portions, a male screw portion formed along the outer circumference of said locker, and a coupler screw-coupled to said male screw portion for adjusting the diameter of said locker.

17. The device for locking a driving motor of a disc player as claimed in claim 15, wherein said pressing portion of said motion part comprises an oil hydraulic cylinder and a piston.

18. The device for locking a driving motor of a disc player as claimed in claim 10, wherein tips of respective electromotive drivers are fabricated by a magnet or magnetized substance for being easily attached with screws.

19. A device for locking a driving motor of a disc player comprising:

- a fixing part having a base arranged with the turntable driving motor and a turntable assembly onto an upper plane thereof for fixedly arranging a drive chassis installed to a plane perpendicular to a motor shaft to an upper plane of said driving motor, a supporting stand bent to extend in the motor shaft direction from said base, and an upper panel portion bent to extend in the direction in parallel with said base at a predetermined height from said supporting stand;
- a screw-coupling part installed to an upper portion of said fixing part for screw-coupling said drive chassis to said driving motor, and arranged with electromotive drivers to respective portions corresponding to a plurality of screw recesses formed to said drive chassis and driving motor, said electromotive drivers being installed to be identically distanced from corresponding screw recesses in the motor shaft direction and installed to be symmetrically positioned by using the central portion as a reference, said symmetrically positioned electromotive drivers for inserting the screws while being rotated at the same speed and with the same torque in the opposite direction to each other during the screw-coupling operation;
- a motion part having a chuck member movable in the motor shaft direction while being joined with said screw-coupling part and a pressing portion for controlling the motion of said chuck member, for transferring said screw-coupling part in said motor shaft direction toward or opposite to said fixing part; and
- a first driving part for driving said motion part.

20. A device for locking a driving motor of a disc player comprising:

- a fixing part having a base arranged with the turntable driving motor and a turntable assembly onto an upper plane thereof for fixedly arranging a drive chassis installed to a plane perpendicular to a motor shaft to an upper plane of said driving motor, a supporting stand bent to extend in the motor shaft direction from said base, and an upper panel portion bent to extend in the direction in parallel with said base at a predetermined height from said supporting stand;
- a screw-coupling part installed to an upper portion of said fixing part for screw-coupling said drive chassis to said driving motor, and arranged with drivers to respective portions corresponding to a plurality of screw recesses formed to said drive chassis and driving motor, said drivers being installed to be identically distanced from corresponding screw recesses in the motor shaft direction;

a motion part including a chuck member movable in the motor shaft direction while being joined with said screw-coupling part and a pressing portion for controlling the motion of said chuck member, for transferring said screw-coupling part in said motor shaft direction toward or opposite to said fixing part;

a first driving part for driving said motion part; and a second driving part for driving said drivers of said screw-coupling part by means of a single motor having said single motor installed approximately to the center thereof and a gear portion connected to a rotating shaft of said single motor, said gear portion including a main gear installed to said rotating shaft of said single motor, a direction-shifting gear brought into meshing engagement with one side of said main gear, a first sub-gear brought into meshing engagement with said direction-shifting gear, and a second sub-gear brought into meshing engagement with the opposite side of said main gear, wherein the gear shafts of said first and second sub-gears are installed to coincide with rotating shafts of said drivers for rotating said symmetrically positioned two drivers of said screw-coupling part in the opposite direction to each other at the same speed and with the same torque.

* * * * *